United States Patent [19]

Fossberg

[11] 3,852,978

[45] Dec. 10, 1974

[54] FLEXIBLE OIL BOOM

[76] Inventor: Robert A. Fossberg, 1594 De la Broquerie, Bruno, Quebec, Canada

[22] Filed: May 23, 1973

[21] Appl. No.: 363,040

Related U.S. Application Data

[63] Continuation-in-part of Ser. No. 70,333, Sept. 8, 1970, abandoned.

[52] U.S. Cl. .............................................. 61/1 F
[51] Int. Cl. ........................................... E02b 15/04
[58] Field of Search ......... 61/1 F; 210/242, DIG. 21

[56] References Cited
UNITED STATES PATENTS

| | | | |
|---|---|---|---|
| 1,397,891 | 11/1921 | Jones | 61/1 F |
| 3,184,923 | 5/1965 | Galvaing | 61/1 F |
| 3,537,587 | 11/1970 | Kain | 210/242 |
| 3,592,007 | 7/1971 | Renner | 61/1 F |
| 3,613,376 | 10/1971 | Midby | 61/1 F |
| 3,713,410 | 1/1973 | Ducrocq et al. | 61/1 F |

FOREIGN PATENTS OR APPLICATIONS

| | | | |
|---|---|---|---|
| 1,305,469 | 1962 | France | 61/1 F |
| 804,640 | 1957 | Great Britain | 61/1 F |

OTHER PUBLICATIONS
"Ocean Industry" June 1970, pages 54, 60.

Primary Examiner—W. C. Reynolds
Assistant Examiner—Alex Grosz

[57] ABSTRACT

A flexible oil boom is described which combines the important features of strength and light weight as well as stability in choppy wave action. The boom comprises a barrier wall of sheet material for deploying in a substantially vertical position in the water and having an upper portion and a lower portion. These upper and lower portions are sewn together by an overlapping connection at a location below the water line. At spaced locations along the length of the boom are positioned vertical stiffeners and immediately adjacent each stiffener there is provided a flexible float connecting strap which surrounds the lower edge of the upper portion and passes through the overlapping connection between the upper and lower portions so that free ends of the strap extend out of each side of the barrier wall. Each strap free end is detachably connected to an individual float member. Individual weights are connected to the barrier wall at the lower end of each stiffener rod pocket. This arrangement permits limited independent movement of each stiffener and adjacent portions of the barrier wall both horizontally and vertically relative to the remainder of the boom whereby the boom can respond to choppy wave action.

6 Claims, 7 Drawing Figures

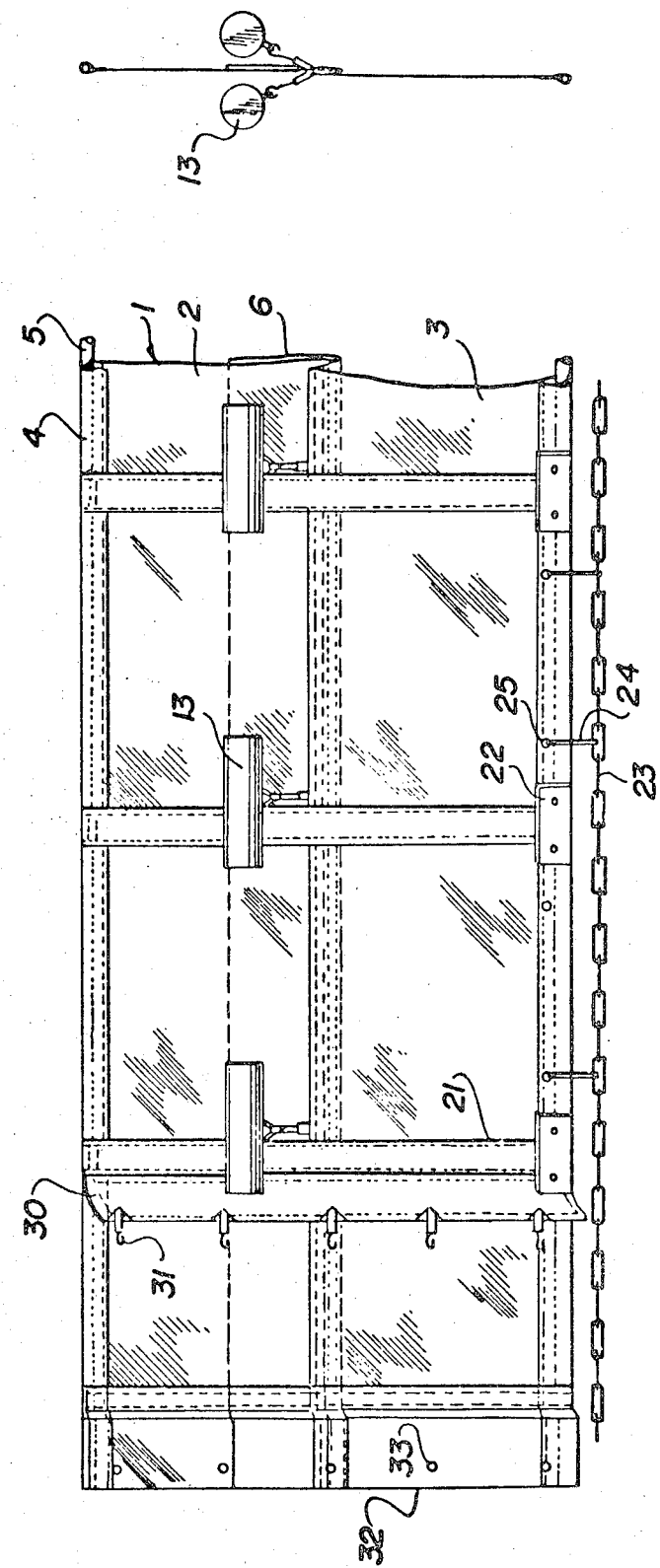

FLEXIBLE OIL BOOM

This is a continuation-in-part of application Ser. No. 070,333, filed Sept. 8, 1970, now abandoned.

BACKGROUND OF THE INVENTION

1. Field of the Invention

The invention relates to a flexible boom system for catching and collecting residues, such as oil spills, from the surface of bodies of water.

2. Description of the Prior Art

With the tremendous rate of industrialization that is taking place throughout the world, pollution of bodies of water by oil spills is reaching critical proportions. Not only are major oil spills occurring, such as when an oil tanker is wrecked, but minor oil spills are a daily occurrence throughout the world. Many different systems are being tested for removing the effects of these oil spills and one of the most successful techniques has been to contain the spills by means of booms and then to collect the contained oil from the surface of the water, e.g., by skimmers. Such oil booms can be used not only for containing a major oil spill but they can also be used for isolating terminals with a permanent installation, temporarily encircling tankers while being unloaded and loaded, sweeping port areas for removing floating patches of oil, protecting beaches, etc. In order to provide the necessary versatility, these oil booms must be inexpensive, light, easy to clean and easy to store and handle.

One of the most successful oil booms on the market today is in the form of a flexible fabric barrier wall which floats vertically in the water with part of the barrier wall extending a distance below the water surface and a part extending above the water surface. The most versatile of these flexible booms are supported in the water by means of separately attached floats. Spaced vertical stiffeners are provided to maintain the boom in the necessary vertical position and they are stabilized by means of weights along the bottom submerged edge. These booms are made up and stored in convenient sections, e.g., of about 100 feet in length, and when needed are attached together and deployed in the water to surround and contain the oil spill.

It has been our experience in using the commercially available flexible oil booms that particularly in adverse sea and wind conditions there is a tendency for them to fail because of tearing under the strain of the sea conditions and also a tendency for the attached floats to be torn away, thus allowing the boom to become submerged in certain areas and consequently destroying the entire purpose of trying to totally contain the oil spill.

Another difficulty is that the water is always in motion with small, choppy waves breaking on one side of the flexible boom. This means that the boom must at all times be capable of very rapidly conforming to changes in the contours of the water surface. In other words, for a boom to gain commercial acceptance it must be inexpensive to produce, easy to store and deploy, easy to clean, strong enough to withstand heavy sea conditions, stable enough to remain upright and yet flexible enough to quickly react to small, choppy wave action.

One prior design which meets many of the above requirements is the boom described in Henke, French Pat. No. 2,009,655. This shows a boom having a barrier wall with an overlapped fabric portion at the water line and a continuous flap portion extending through the overlap, with floats mounted on or in the flap portions. When floating in water the float flaps extend horizontally outwardly from the curtain wall and are prevented from swinging upwardly beyond the horizontal by means of inclined continuous web strips mounted between the outer ends of the flaps and lower sections of the curtain wall.

However, this design has several disadvantages. Firstly, the floats are permanently mounted, making folding and storage difficult. Secondly, the web strips create pockets within which oil tends to collect and it becomes virtually impossible to remove this oil when the boom is being cleaned, dried and stored for subsequent use.

Another significant prior design is described in Kain, U.S. Pat. No. 3,537,587, having a vertical barrier wall and detachable float members. However the barrier wall is of a heavy, complex design with an inner grid of interconnected steel cables for strength. This makes the barrier wall expensive to manufacture and heavy to handle as well as being difficult to fold compactly. Moreover, the float units are "spaced sufficiently close together to effect substantially continuous support of the vertical barrier wall" and an individual float is described as being "18 feet in length." Such a float arrangement, as well as the rather stiff barrier wall construction, prevents a quick response to small, choppy wave action so that the boom will not flex and ride with the waves. The result of this poor response to small wave action is that the water may pass over the top of the boom or a section of the boom may rise with a series of wave crests leaving gaps beneath the boom. In either situation oil leakage occurs.

SUMMARY OF THE INVENTION

According to the present invention a flexible oil boom is produced comprising a barrier wall of flexible sheet material having an upper portion and a lower portion. These upper and lower portions are joined together by an overlapping connection at a location below the water line. At spaced locations along the length of the barrier wall are a series of substantially vertical pockets, each containing a stiffening rod for holding the boom in a vertically upright position. Flexible straps are mounted in the overlapping connection such that each strap surrounds the lower edge of the upper portion and is sewn into the overlapping connection such that free ends of the strap extend outwardly from each side of the barrier wall for connecting floats thereto. Each strap is sewn into the overlapping connection as close as is possible to each stiffening rod pocket. Individual weights are attached to the barrier wall at the lower end of each stiffener rod pocket.

When the boom is deployed in a body of water, an individual float is attached to each strap end so that a pair of opposed floats are associated with each stiffening rod. This pair of opposed floats at the water line and the weights at the lower end tend to maintain each stiffening rod in a substantially vertical position. The barrier wall between the stiffening rods is, of course, quite flexible and can flex both horizontally and vertically. Thus, in choppy wave action the boom is able to ride the waves because the portion of the barrier wall in the region of each stiffening rod is able to rise and fall with choppy waves without affecting more remote portions of the boom. The result is a lightweight, strong, inexpensive boom capable of showing excellent stability in choppy wave action.

DESCRIPTION OF THE PREFERRED EMBODIMENTS

According to a particularly preferred feature of the invention a double thickness of barrier wall fabric is provided in the region between the connection of the upper and lower portions and a location slightly above the water line. This double thickness portion provides additional strength against damage from floating objects on the water, such as logs, which might tear through a single thickness of fabric. The barrier wall is preferably made from a synthetic fabric, such as nylon, and can be coated with a protective coating, such as polyvinyl chloride.

The upper and lower edge of the barrier wall are preferably formed with a longitudinal pocket which contains a strengthening rope.

It has also been found to be highly desirable to join the upper and lower portions of barrier wall and the float connecting straps by stitching longitudinally on a sewing machine.

As has been explained above, the boom of this invention shows exceptional stability properties in choppy wave action because of its manner of construction. However, the simple design of the barrier wall itself provides a rather unexpected bonus of greatly simplifying cleaning. Thus, when the floats have been removed the barrier wall, except for the small floating connecting straps, exhibits a continuous flat surface and this means that there are no overlying flaps, etc. under which oil collects. The result is that for cleaning the boom of this invention after it has been used, it is simply a matter of unhooking the floats, passing the barrier wall through a washing machine where rotary brushes scrub the faces of the barrier wall and then hanging it up to dry. It can then be folded and stored in a container until it is again used. It will be appreciated that the ability to remove oil from the boom is most important in terms of being able to store the boom in folded form and at some later date easily unfold it again and quickly deploy it in the water.

The invention will now be illustrated by the following drawings wherein:

FIG. 1 is a side elevation of a section of a boom according to the invention;

FIG. 2 is an end elevation of a boom according to FIG. 1;

Figures 4, 5, 6:
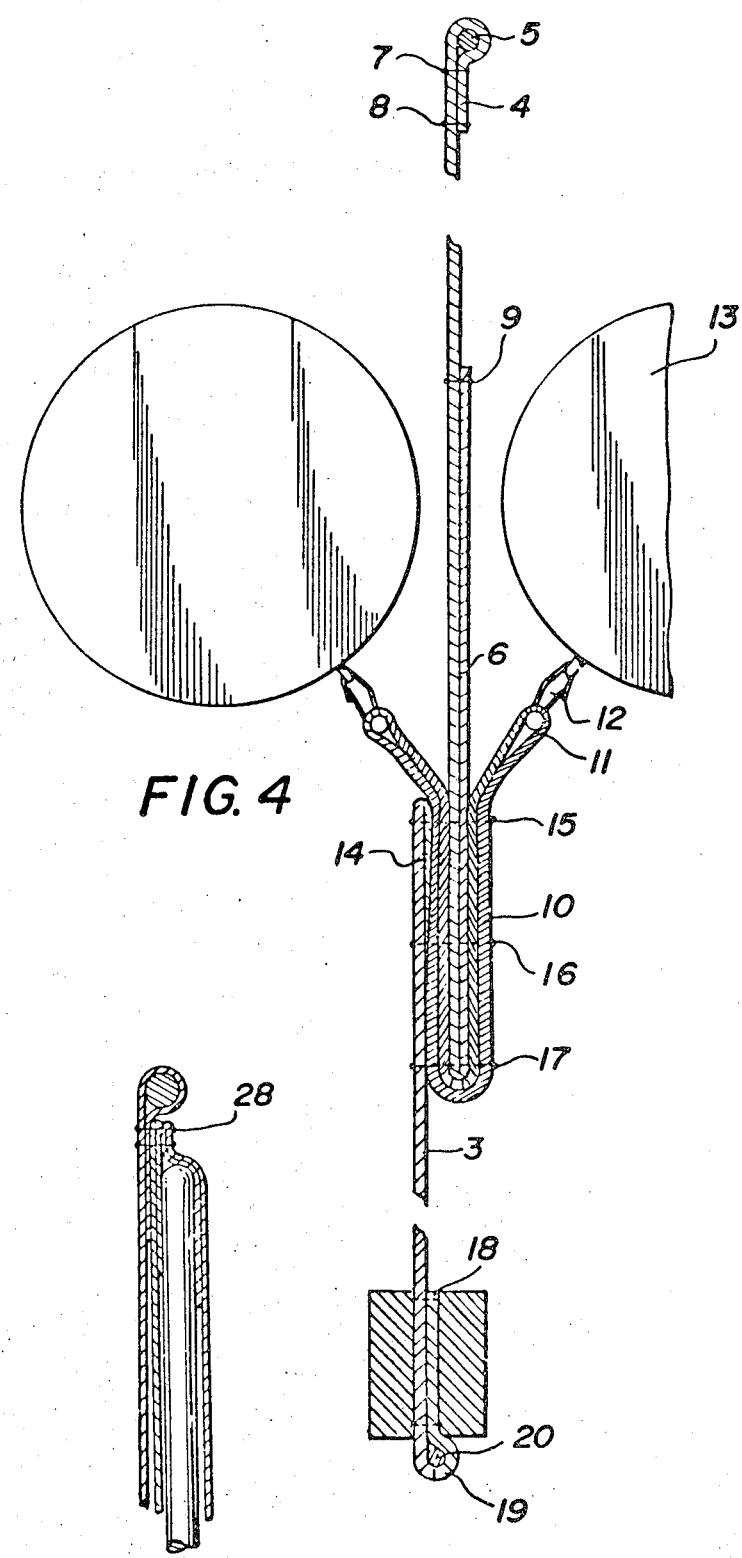
FIG. 4 is a sectional view showing details of the connection between the upper and lower portions of the barrier wall.
FIG. 5 is a sectional view showing details of a vertical stiffening rod.
FIG. 6 is a partial sectional view showing details of a particularly preferred arrangement of the vertical stiffener.
Figure 3:
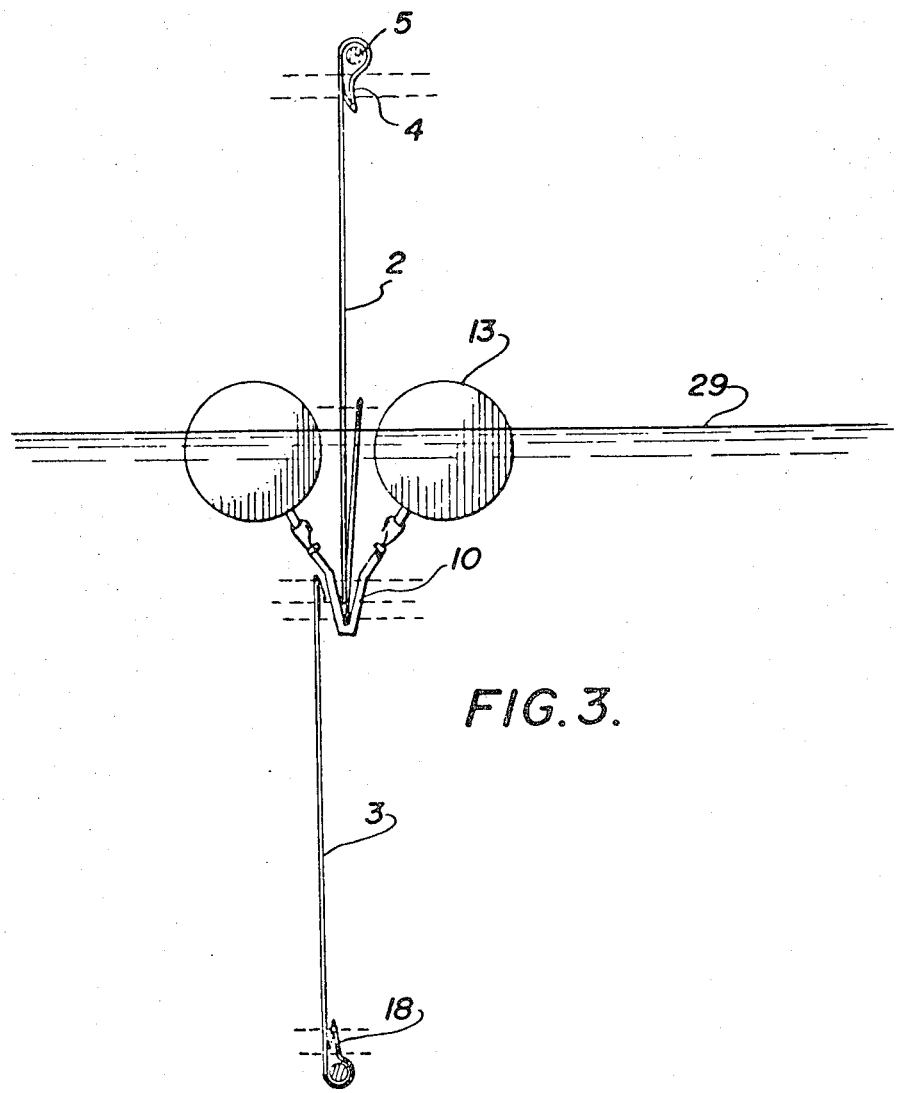
FIG. 3 is an exploded end elevation showing the manner in which the components are connected.

As will be seen particularly from FIGS. 1 to 4, the barrier wall 1 comprises an upper portion 2 and a lower portion 3. The upper portion 2 has an overlapping section 4 at the upper edge thereof forming a pocket within which is positioned a nylon or polyolefin rope 5. The overlapped portion 4 is sewn longitudinally along the length of the boom by means of two seams 7 and 8.

The lower edge of upper portion 2 includes a large overlapping portion 6 which extends slightly above the water line 29 so as to provide a double walled section immediately above and immediately below the water level. This overlapped portion 6 is stitched to the main upper portion 2 by means of the seam 9.

The lower barrier wall portion 3 overlaps the lower edge of the upper barrier wall portion 2 and is sewn thereto by means of seams 15, 16 and 17. At longitudinally spaced locations float holding straps 10 are provided and these extend through the overlapping connection between barrier wall sections 2 and 3 in a double fashion so as to provide upwardly extending loops 11. These straps 10 are positioned in the connection between the upper and lower barrier wall portions before the stitching takes place so that when the longitudinal seams 15, 16 and 17 are inserted, they also anchor the straps 10 into position.

When the straps 10 are being assembled into position, snap hooks 12 are inserted in the loops 11 and these snap hooks 12 are used for attaching the floats 13.

The upper edge of lower barrier wall portion 3 is also provided with an overlapping section 14 which is also sewn into the connection between the upper and lower portions and the lower end of portion 3 has an overlapping portion 18 forming a loop 19 within which is positioned a second longitudinally extending nylon or polyolefin rope 20.

A strengthening and weighting chain 23 is positioned along the bottom edge of the boom and this is connected to the bottom edge of the boom by means of screw pin shackles 24 in eyelets 25.

At longitudinal spaced locations along the length of the boom are positioned vertical stiffeners 21 and these consist of metal rods 26 encased in fabric pockets 27. These fabric pockets 27 are usually positioned about 2 to 4 feet apart and are sewn to the main portions of the fabric of the curtain wall. In order to decrease the tendency of these rods to puncture through the containing pockets, a double wall arrangement can be provided as shown in FIG. 6 and the pocket is stitched to the main portion of the curtain wall by seams 28 as shown in FIG. 6.

An important feature of the construction is that the straps 10 must be placed as close as practically possible to the stiffeners 21. Usually each strap is placed immediately adjacent the edge of a pocket 27. This means that each stiffener 21 with its associated pair of floats 13 and bottom weights 22 acts as an independent buoyancy and stabilizer unit for the boom.

Figure 7:
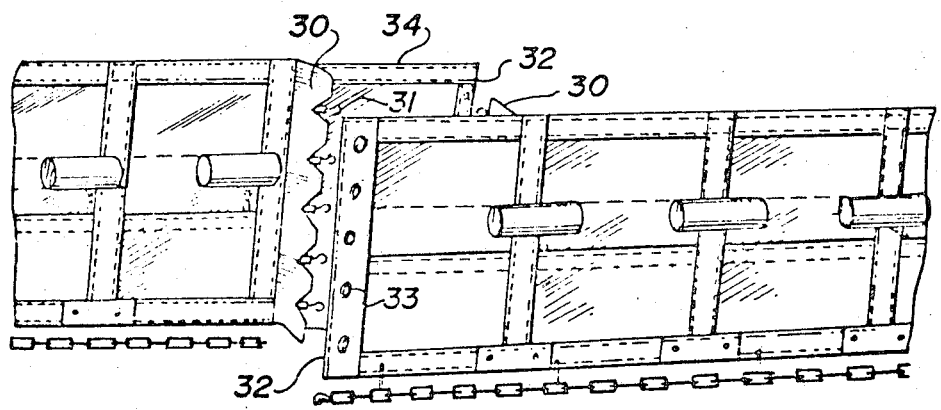
FIG. 7 is a perspective view of a connection between two boom sections.

To make up a total operational boom, lengths must be connected together and the connecting arrangement can be seen from FIG. 7. Thus, a flap member 30 is provided which is spaced a distance from the end 32 of the boom and this flap 30 is stitched to the barrier wall. Mounted in the flap 30 are a series of snap hooks 31. Adjacent the end 32 of the boom are a matching series of eyelets 33 so that the two sections of boom are joined together with an overlapping section 34. At this connecting point the two chains 23 can also be connected together for additional strength.

The invention will now be further illustrated by the following non-limiting example:

EXAMPLE

Based on the above detailed description, a flexible oil boom was produced in lengths of 100 feet. The barrier wall of the boom was produced from a polyvinyl chloride coated nylon fabric having a tensile strength of 450 pounds per inch while the upper and lower ropes 5 and 20 were ⅜ inch diameter nylon line. The total height of the barrier wall was 3 feet, arranged so that a 1 foot section extended above the water level and a 2 feet section was submerged. The joint between the upper and lower sections of the barrier wall was positioned 18 inches from the top of the barrier wall and the upper edge of the double wall portion extended about 1 inch above the water line.

The vertical stiffeners were placed 2 feet apart and each stiffener consisted of a ⅜ inch diameter aluminum rod mounted in a pocket of the same nylon fabric as the barrier wall itself. At the bottom of each stiffening member a pair of lead weights were attached by means of copper rivets each pair of lead weights weighing approximately 2.2 pounds.

The float connections were positioned immediately adjacent the stiffener pockets and the floats used were Sundlet Type 100/250 (Buoyancy 1690 grams each).

The boom made in this manner was found to be extremely strong yet light in weight, flexible and very easy to handle. The storage area required for 100 feet of this boom is approximately 3 feet by 3 ½ feet by 18 inches and the boom weighs about 2.5 pounds per linear foot. An additional space of about 3 feet by 3 feet by 20 inches is required for the floats to support a 100 foot section.

I claim:

1. A flexible boom for catching and collecting residues from the surface of bodies of water comprising:
    a. a barrier wall of flexible sheet material for depolying in a substantially vertical position in the water such that the upper edge thereof is above the water surface and the lower edge thereof is below the water surface, said barrier wall having an upper portion and a lower portion sewn together by an overlapping longitudinal connection at a location below the water surface,
    b. a plurality of substantially vertical pockets in spaced relationship along the length of said barrier wall with each pocket containing a stiffening rod,
    c. a series of flexible float connecting straps, each being positioned immediately adjacent a vertical stiffener pocket and each surrounding the lower edge of the barrier wall upper portion and passing through the overlapping sewn connection such that the free ends of each strap extend outwardly from each side of the barrier wall for connecting floats thereto, and
    d. individual weights connected to the barrier wall at the lower end of each stiffener pocket,
    whereby when the boom is deployed in the water with an individual float connected to each strap free end on each side of each vertical stiffener, each combination of vertical stiffeners, opposed pairs of floats and lower edge weights maintains the boom in a substantially vertical position in the water while permitting limited independent movement of each stiffener and adjacent portions of the flexible barrier wall in both vertical and horizontal directions relative to the remainder of the boom under the action of small choppy waves.

2. A flexible boom according to claim 1, wherein the upper portion of the curtain wall includes a double thickness of fabric between the overlapping connection and a location slightly above the water line.

3. A flexible boom according to claim 2, which includes strengthening ropes mounted within longitudinal pockets formed at the upper and lower edges of the barrier wall.

4. A flexible boom according to claim 3, which includes a chain extending adjacent the lower edge of the barrier wall and connected to the barrier wall at spaced locations.

5. A flexible boom according to claim 1, wherein the stiffening rods are spaced about 2 to 4 feet apart.

6. A flexible boom according to claim 1 wherein each float is connected to each strap free end by means of a snap hook.

* * * * *